United States Patent
Faibish et al.

(10) Patent No.: US 9,465,549 B1
(45) Date of Patent: Oct. 11, 2016

(54) DYNAMIC ALLOCATION OF A HIGH-SPEED MEMORY POOL BETWEEN A CLUSTER FILE SYSTEM AND A BURST BUFFER APPLIANCE

(71) Applicant: EMC Corporation, Hopkinton, MA (US)

(72) Inventors: Sorin Faibish, Newton, MA (US);
John M. Bent, Los Alamos, NM (US);
Percy Tzelnic, Concord, MA (US);
Uday Gupta, Westford, MA (US);
James M. Pedone, Jr., West Boylston, MA (US)

(73) Assignee: EMC Corporation, Hopkinton, MA (US)

( * ) Notice: Subject to any disclaimer, the term of this patent is extended or adjusted under 35 U.S.C. 154(b) by 230 days.

(21) Appl. No.: 14/134,748

(22) Filed: Dec. 19, 2013

(51) Int. Cl.
*G06F 15/167* (2006.01)
*G06F 3/06* (2006.01)
*H04L 29/08* (2006.01)

(52) U.S. Cl.
CPC .............. *G06F 3/0613* (2013.01); *G06F 3/067* (2013.01); *G06F 3/0656* (2013.01); *H04L 67/1097* (2013.01)

(58) Field of Classification Search
CPC ........................... G06F 9/45533; G06F 13/40
USPC .......................................... 709/212–214, 216
See application file for complete search history.

(56) References Cited

U.S. PATENT DOCUMENTS

| | | | |
|---|---|---|---|
| 8,782,232 B2* | 7/2014 | Muhlestein | H04L 63/10 709/212 |
| 9,128,826 B2* | 9/2015 | Nowoczynski | G06F 12/0246 |
| 2009/0172306 A1* | 7/2009 | Nussbaum | G06F 9/466 711/154 |
| 2009/0249018 A1* | 10/2009 | Nojima | G06F 3/0613 711/170 |
| 2013/0042003 A1* | 2/2013 | Franco | H04L 67/1097 709/226 |

OTHER PUBLICATIONS

Cluster File Systems, Inc., "Lustre: A Scalable, High-Performance File System," Nov. 2002, pp. 1-13.
F. Wang et al., "Understanding Lustre Filesystem Internals," National Center for Computational Sciences, Tech Report ORNL/TM-2009/117, Apr. 2009, pp. 1-80.
J. Bent et al., PLFS: A Checkpoint Filesystem for Parallel Applications, ACM/IEEE International Conference for High Performance Computing, Networking, Storage and Analysis, Nov. 2009, pp. 1-12.
U.S. Appl. No. 13/728,421 filed in the name of S. Faibish et al. on Dec. 27, 2012 and entitled "Burst Buffer Appliance Comprising Multiple Virtual Machines."

* cited by examiner

*Primary Examiner* — Joseph Greene
(74) *Attorney, Agent, or Firm* — Ryan, Mason & Lewis, LLP (57) ABSTRACT

An apparatus comprises a cluster file system, a burst buffer appliance coupled to the cluster file system, a high-speed memory pool configured for allocation between the cluster file system and the burst buffer appliance, and a controller associated with the high-speed memory pool and configured to dynamically adapt portions thereof between utilization as object storage servers of the cluster file system and utilization as burst buffers of the burst buffer appliance. By way of example, the high-speed memory pool comprises a plurality of flash servers that are reconfigurable between utilization as respective ones of the object storage servers of the cluster file system and utilization as respective ones of the burst buffers of the burst buffer appliance. The controller is configured to dynamically adapt the flash servers between utilization as respective object storage servers of the cluster file system and utilization as respective burst buffers of the burst buffer appliance.

20 Claims, 6 Drawing Sheets

DYNAMIC ALLOCATION OF A HIGH-SPEED MEMORY POOL BETWEEN A CLUSTER FILE SYSTEM AND A BURST BUFFER APPLIANCE

FIELD

The field relates generally to information processing systems, and more particularly to information processing systems that incorporate cluster file systems.

BACKGROUND

It is common in high-performance computing (HPC) systems and other information processing systems for multiple compute nodes to access a cluster file system. For example, HPC systems such as supercomputers typically include large numbers of compute nodes that access a parallel file system, distributed file system or other type of cluster file system. A cluster file system as the term is broadly used herein generally allows multiple compute nodes or other types of clients to share access to files over a network.

One well-known cluster file system is the Lustre file system. Lustre is a Linux-based high performance cluster file system utilized for computer clusters ranging in size from small workgroup clusters to large-scale, multi-site clusters. Lustre can readily scale to support tens of thousands of clients, petabytes of storage capacity, and hundreds of gigabytes per second of aggregate input-output (IO) throughput. Due to its high performance and scalability, Lustre is utilized in many supercomputers, as well as other complex computing environments, including large enterprise data centers.

In conventional Lustre implementations, it can be difficult to balance the conflicting requirements of storage capacity and IO throughput. IO operations on object storage servers are generally performed directly with back-end storage arrays associated with those servers, and the corresponding storage devices may not be well matched to the current needs of the system. This can lead to situations in which either performance is less than optimal or the costs of implementing the system become excessive.

Accordingly, despite the many advantages of Lustre file systems and other similar cluster file systems, a need remains for additional improvements, particularly with regard to IO operations. For example, further acceleration of IO operations, leading to enhanced system performance relative to conventional arrangements, would be desirable. Additionally or alternatively, an ability to achieve particular levels of performance at lower cost would be advantageous.

SUMMARY

Illustrative embodiments of the present invention provide techniques for dynamic allocation of a shared high-speed memory pool between a cluster file system and at least one burst buffer appliance. These techniques can significantly improve the performance of the cluster file system, permitting acceleration of IO operations, leading to enhanced system performance relative to conventional arrangements, while also providing an ability to achieve particular levels of performance at lower cost. Additionally or alternatively, such techniques can advantageously facilitate the implementation of functionality such as checkpointing policies and power consumption control.

In one embodiment, an apparatus comprises a cluster file system, a burst buffer appliance coupled to the cluster file system, a high-speed memory pool configured for allocation between the cluster file system and the burst buffer appliance, and a controller associated with the high-speed memory pool and configured to dynamically adapt portions thereof between utilization as object storage servers of the cluster file system and utilization as burst buffers of the burst buffer appliance.

By way of example, the high-speed memory pool comprises a plurality of flash servers that are reconfigurable between utilization as respective ones of the object storage servers of the cluster file system and utilization as respective ones of the burst buffers of the burst buffer appliance. The controller is configured to dynamically adapt the flash servers between utilization as respective object storage servers of the cluster file system and utilization as respective burst buffers of the burst buffer appliance.

The controller in some embodiments dynamically adapts portions of the high-speed memory pool by adjusting allocation of the high-speed memory pool between the cluster file system and the burst buffer appliance in order to achieve a desired level of IO performance. The desired level of IO performance may be specified, for example, in a request received from an application running on a compute node. The adjustment in allocation of the high-speed memory pool may be based on other factors such as permitting implementation of a desired checkpointing policy including a specified checkpoint duration or achieving a desired level of power consumption for the cluster file system.

Other embodiments include without limitation methods, apparatus, systems, and articles of manufacture comprising processor-readable storage media.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising private and public cloud computing or storage systems, as well as other types of processing systems comprising physical or virtual processing resources in any combination.

Figure 1:
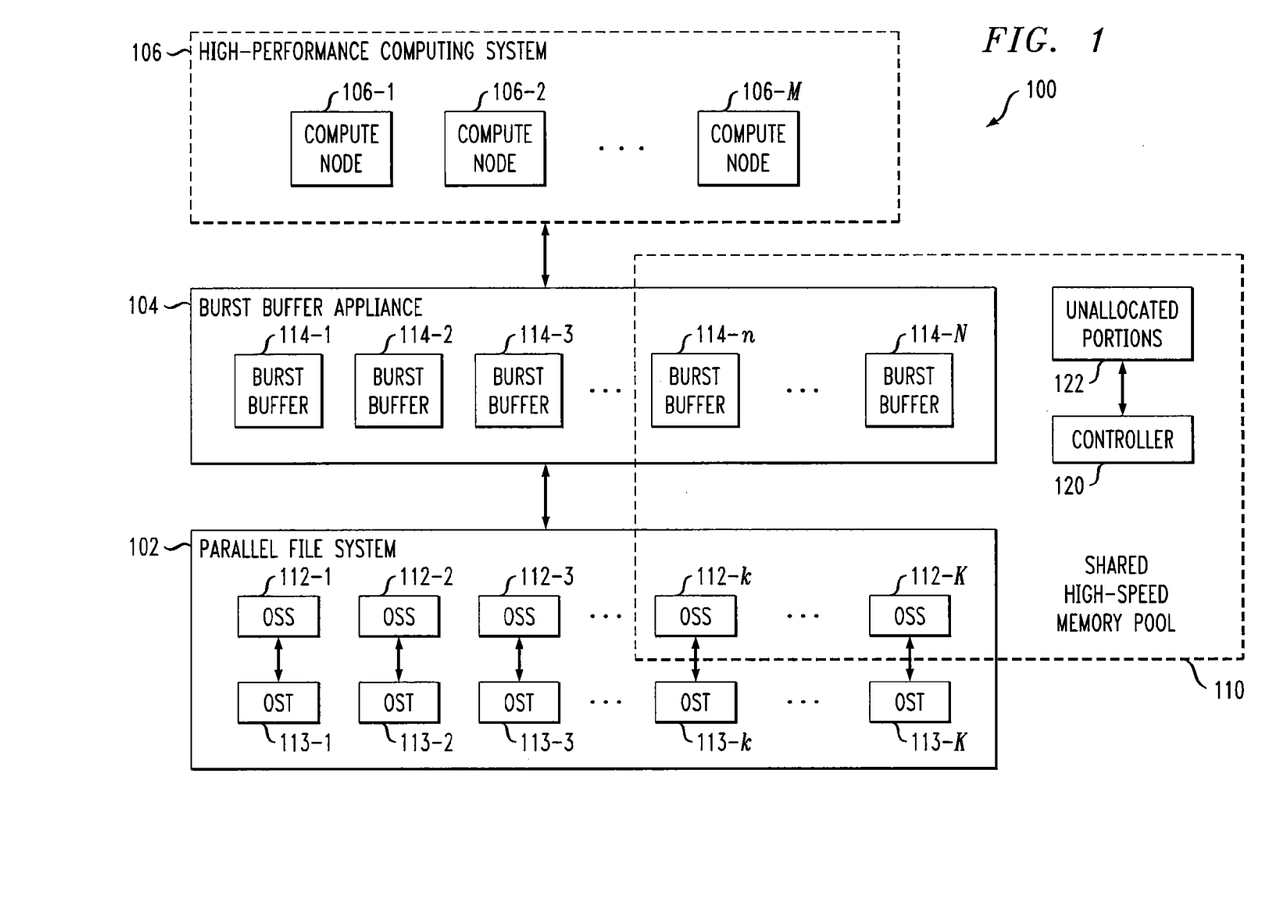
FIG. 1 is a block diagram of an information processing system incorporating functionality for dynamic allocation of a high-speed memory pool between a cluster file system and a burst buffer appliance in an illustrative embodiment of the invention.

FIG. 1 shows an information processing system 100 configured in accordance with an illustrative embodiment of the present invention. The information processing system 100 comprises a parallel file system 102, a burst buffer appliance 104 and a plurality of compute nodes 106-1, 106-2, . . . 106-M. The compute nodes 106 are also collectively referred to as an HPC system, which may comprise, for example, a supercomputer. Such an HPC system is an example of what is more generally referred to herein as a "computer system."

The burst buffer appliance 104 is coupled between the parallel file system 102 and the HPC system comprising compute nodes 106. The parallel file system 102 is assumed by way of example to comprise multiple distinct file systems arranged in parallel with one another. The parallel file system 102 is an example of what is more generally referred to herein as a "cluster file system." Such a cluster file system may be implemented, for example, as a Lustre file system. Conventional aspects of Lustre file systems are described in, for example, Cluster File Systems, Inc., "Lustre: A Scalable, High-Performance File System," November 2002, pp. 1-13, and F. Wang et al., "Understanding Lustre Filesystem Internals," Tech Report ORNL/TM-2009/117, April 2010, pp. 1-95, which are incorporated by reference herein.

Alternatively, the parallel file system 102 may be implemented as a distributed file system such as Hadoop Distributed File System (HDFS), or as a combination of a Lustre file system and an HDFS. The term "cluster file system" as used herein is therefore intended to be broadly construed, so as to encompass, for example, Lustre file systems, distributed file systems, parallel file systems, or various combinations thereof, as well as other types of file systems implemented using one or more clusters of processing devices.

Other embodiments may include multiple burst buffer appliances 104, with each such appliance adapted for coupling between at least a portion of the parallel file system 102 and one or more compute nodes 106 of the HPC system.

Numerous other types and arrangements of cluster file systems, burst buffer appliances and computer systems may be used in other embodiments of the invention.

The information processing system 100 further comprises a shared high-speed memory pool 110 that is configured for allocation between the parallel file system 102 and the burst buffer appliance 104.

As illustrated in the figure, the parallel file system 102 comprises a plurality of object storage servers or OSSs 112 having corresponding object storage targets or OSTs 113. These pairs of OSS and OST components are illustratively arranged in parallel with one another as shown in the figure. Although only a single OST is associated with each OSS in the FIG. 1 embodiment, this is for purposes of simplicity and clarity of illustration only, and other embodiments may associate multiple OSTs with each OSS.

A subset of the OSSs 112, illustratively the OSSs 112-$k$, . . . 112-K, are currently allocated to the parallel file system 102 from the shared high-speed memory pool 110. Other OSSs, illustratively at least the OSSs 112-1, 112-2 and 112-3, are dedicated to the parallel file system 102 and therefore not considered part of the shared high-speed memory pool 110. In other embodiments, the parallel file system 102 need not include any dedicated OSSs, and instead all of its OSSs 112 may be dynamically assigned via allocation from the shared high-speed memory pool 110.

The exemplary OSTs 113 corresponding to respective ones of the exemplary OSSs 112-1, 112-2, 112-3, . . . 112-$k$, . . . 112-K are more particularly denoted in the figure as OSTs 113-1, 113-2, 113-3, . . . 113-$k$, . . . 113-K.

Although the OSTs 113 are shown as being external to the OSSs 112 in the FIG. 1 embodiment, in other embodiments an OST may be at least partially implemented within a corresponding OSS. It should therefore be appreciated that the term "object storage server" as used herein is intended to be broadly construed, and in other embodiments a given object storage server may incorporate one or more associated object storage targets. Thus, allocation of portions of the shared high-speed memory pool 110 for use as object storage servers in embodiments herein should be understood to include use of at least part of an allocated portion in associated object storage targets.

For example, when portions of the high-speed memory pool are described herein as being used as OSSs such portions may be implemented in a high-speed storage tier of a multi-tiered arrangement of OSSs and associated OSTs.

Although not explicitly shown in FIG. 1, at least one metadata server or MDS and at least one metadata target or MDT may be associated with the parallel file system 102. A given such MDS utilizes one or more corresponding MDTs to provide metadata services for the parallel file system 102. The MDT stores file metadata, such as file names, directory structures, and access permissions.

The OSTs 113 and any MDT components of parallel file system 102 in given embodiment are illustratively implemented using one or more storage arrays. Such storage arrays may comprise, for example, storage products such as VNX® and Symmetrix VMAX®, both commercially available from EMC Corporation of Hopkinton, Mass. A variety of other storage products may be utilized to implement at least a portion of the OSTs 113 and any MDTs of the parallel file system 102.

The burst buffer appliance 104 includes a plurality of burst buffers 114, more particularly denoted as burst buffers 114-1, 114-2, 114-3, . . . 114-$n$, . . . 114-N. A subset of these burst buffers, illustratively the burst buffers 114-$n$, . . . 114-N, are currently allocated to the burst buffer appliance 104 from the shared high-speed memory pool 110. Other burst buffers, illustratively at least the burst buffers 114-1, 114-2 and 114-3, are dedicated to the burst buffer appliance 104 and therefore not considered part of the shared high-speed memory pool 110. In other embodiments, the burst buffer appliance 104 need not include any dedicated burst buffers, and instead all of its burst buffers 114 may be dynamically assigned via allocation from the shared high-speed memory pool 110.

Accordingly, some alternative embodiments may allocate not only all of the OSSs 112 but also all of the burst buffers 114 from the shared high-speed memory pool 110. In arrangements of this type, substantially all of the allocable portions of the shared high-speed memory pool 110 may be allocated to the parallel file system 102 for use as OSSs 112 under one set of operating conditions, and those same allocable portions of the shared high-speed memory pool 110 may be allocated to the burst buffer appliance 104 for use as burst buffers 114 under a different set of operating conditions.

A variety of different operating conditions and other factors may be taken into account in allocating portions of the shared high-speed memory pool 110 between the parallel file system 102 and the burst buffer appliance 104.

For example, allocations of portions of the high-speed memory pool 110 between the parallel file system 102 and the burst buffer appliance 104 may be adjusted in order to achieve a desired level of IO performance, either for the system 100 or for portions thereof, such as particular ones of the compute nodes 106. In some embodiments, the adjustment may be based at least in part on information received from an application running on one or more of the compute nodes 106, such as a request that is received from the application and that specifies a desired level of IO performance for the application.

It is also possible to adjust allocation of the high-speed memory pool 110 between the parallel file system 102 and the burst buffer appliance 104 in order to permit implementation of a desired checkpointing policy including a specified checkpoint duration. Examples of different possible allocations associated with respective different checkpointing policies will be described below in conjunction with FIGS. 3 through 5.

Additionally or alternatively, allocation of the high-speed memory pool between the parallel file system 102 and the burst buffer appliance 104 can be adjusted in order to achieve a desired level of power consumption for at least a portion of the parallel file system, such as portions that utilize disk storage devices for the OSTs 113.

The foregoing are merely examples, and numerous other types of operating conditions and other factors can be taken into account in determining appropriate variations in the allocation of the high-speed memory pool 110 between the parallel file system 102 and the burst buffer appliance 104 as a function of time.

The allocation of the allocable portions of the shared high-speed memory pool 110 is determined by a controller 120 that is a component of or otherwise associated with the high-speed memory pool 110. The controller 120 is configured to dynamically adapt portions of the shared high-speed memory pool between utilization as OSSs 112 of the parallel file system 102 and utilization as burst buffers 114 of the burst buffer appliance 104, taking into account current operating conditions and other factors of the type mentioned above.

In embodiments that include multiple burst buffer appliances 104, the high-speed memory pool 110 may be adapted for allocation between the parallel file system 102 and the multiple burst buffer appliances. Thus, the controller 120 can allocate portions of the high-speed memory pool to multiple burst buffers as well as to the parallel file system 102, again depending upon operating conditions or other factors.

The controller 120 need not allocate all allocable portions of the shared high-speed memory pool 110 at all times. Accordingly, the shared high-speed memory pool 110 at certain times includes unallocated portions 122 that are not currently allocated to either the parallel file system 102 or the burst buffer appliance 104, but are nonetheless available for assignment in conjunction with future allocation adjustments.

The parallel file system 102 and burst buffer appliance 104 may be viewed as representing respective distinct storage tiers of the system 100, with the controller 120 dynamically adapting the resources of those tiers through changes in the manner in which the resources of the high-speed memory pool 110 are allocated. Numerous other storage tiering arrangements may be used. For example, the parallel file system 102 may itself include multiple distinct storage tiers, possibly including a first storage tier implemented using flash servers or other allocated portions of the high-speed memory pool 110 and one or more additional lower storage tiers implemented using dedicated OSS resources each associated with one or more OSTs. As indicated above, in other embodiments an "object storage server" as the term is broadly used herein may be viewed as incorporating at least a portion of one or more associated object storage targets.

In some embodiments, the controller 120 comprises or is otherwise associated with one or more job schedulers of the information processing system 100. For example, memory pool allocation determinations can be made at least in part utilizing a job scheduler of the controller 120 responsive to IO requests received in the job scheduler from one or more applications running on the compute nodes 106. Such IO requests and other similar requests referred to herein may be configured, for example, in accordance with standard portable operating system interface (POSIX) system calls. Allocations that are performed utilizing a job scheduler can be implemented differently for each of a plurality of processing jobs, thereby effectively allowing dynamic allocation on a per-job basis.

As the allocation of portions of the shared high-speed memory pool 110 dynamically varies over time based on operating conditions and other factors, a given portion of the memory pool may be configured for utilization as one or more of the OSSs 112 of the parallel file system at one point in time under a first set of operating conditions, and that same portion may be configured for utilization as one or more of the burst buffers 114 of the burst buffer appliance 104 at another point in time under a second set of operating conditions different than the first set of operating conditions.

Although the controller 120 is shown in the present embodiment as being external to the parallel file system 102 and the burst buffer appliance 104, in other embodiments at least portions of the controller 120 may be implemented in one or both of the parallel file system 102 and the burst buffer appliance 104. Thus, for example, the controller 120 may be wholly or partially incorporated in one of the parallel file system 102 or the burst buffer appliance 104, or implemented in a distributed manner using both of those system components. It is also possible for the controller 120 to be implemented on a separate processing device that is associated with a processing platform that comprises at least portions of the at least one of the parallel file system 102 and the burst buffer appliance 104. Numerous other types and arrangements of hardware, software and firmware on one or more processing devices may be used to implement a controller in other embodiments. The term "controller" as used herein is therefore intended to be broadly construed.

The shared high-speed memory pool 110 in the present embodiment is assumed to comprise a plurality of flash servers that are dynamically reconfigurable between utilization as respective ones of the OSSs 112 of the parallel file system 102 and utilization as respective ones of the burst buffers 114 of the burst buffer appliance 104. The controller 120 is therefore configured to dynamically adapt the flash servers between utilization as respective OSSs 112 and burst buffers 114. Accordingly, the subset of OSSs 112-$k$ through 112-K and the subset of burst buffers 114-$n$ through 114-N may illustratively comprise respective flash servers of the shared high-speed memory pool 110. Such a flash server is assumed to be implemented using one or more flash storage devices, although other types of high-speed storage devices can additionally or alternatively be used.

As indicated previously, it is possible in some embodiments that all or nearly all of the flash servers of the high-speed memory pool 110 are allocated for utilization as respective OSSs 112 of the parallel file system 102 under a first set of operating conditions and all or nearly all of the flash servers of the high-speed memory pool 110 are allocated for utilization as respective burst buffers 114 of the burst buffer appliance 104 under a second set of operating conditions different than the first set of operating conditions.

The memory pool 110 is referred to herein as a high-speed memory pool in that it comprises storage devices that are assumed to have a substantially lower access time than disk storage devices that are utilized for at least a subset of the OSTs 113 of the parallel file system 102. The term "high-speed" as used herein with reference to the memory pool 110 or storage devices thereof is a relative term that is intended to be broadly construed, and does not require any particular absolute level of operating speed.

By way of example, the storage devices of the high-speed memory pool may comprise respective flash Peripheral Component Interconnect express (PCIe) cards, although numerous other types of storage devices that exhibit low access times relative to typical disk storage devices may be used. Thus, other types of low-latency memory could be used instead of or in combination with flash memory in other embodiments. Typically, such low-latency memories comprise electronic memories, which may be implemented using non-volatile memories, volatile memories or combinations of non-volatile and volatile memories. More particular examples of alternatives to flash storage devices that may be used in other embodiments of the invention include non-volatile memories such as magnetic random access memory (MRAM) and phase change random access memory (PC-RAM).

It is to be appreciated that the configuration of the burst buffer appliance 104 as illustrated in FIG. 1 is exemplary only. For example, the burst buffer appliance 104 may comprise other types of components not explicitly shown, such as one or more analytics engines. It is also possible in some embodiments for the burst buffer appliance 104 to implement a virtual layer of a parallel log-structured file system (PLFS) above the underlying parallel file system 102, although as indicated previously other types of parallel file systems or more generally cluster file systems may be used in other embodiments.

Additional details regarding PLFS can be found in J. Bent et al., "PLFS: A Checkpoint Filesystem for Parallel Applications," ACM/IEEE Conference on High Performance Computing Networking, Storage and Analysis, SC09, Portland, Oreg., Nov. 14-20, 2009, pp. 1-12, which is incorporated by reference herein. It is to be appreciated, however, that PLFS is not a requirement of any particular embodiment.

As indicated previously, although only a single burst buffer appliance 104 is associated with all of the compute nodes 106 in this embodiment, in other embodiments there may be multiple instances of the burst buffer appliance 104. For example, each compute node or each of other subsets of the compute nodes 106 may have a separate instance of the burst buffer appliance 104 associated therewith. Thus, in some embodiments, a given burst buffer appliance may be coupled between a single compute node and the parallel file system 102. The term "computer system" as broadly used herein should therefore also be understood to encompass an arrangement involving only a single compute node.

The burst buffer appliance 104 may receive data from a variety of sources other than the compute nodes 106, although such other sources are not explicitly shown in the figure. For example, the burst buffer appliance may receive data files comprising sensor data received from sensor networks. It is to be appreciated that a wide variety of additional or alternative data sources may provide data to the burst buffer appliance 104 for storage in the parallel file system 102 in other embodiments.

The burst buffer appliance 104 is generally configured to accelerate IO operations between the compute nodes 106 and the parallel file system 102 by storing associated data in its burst buffers 114. Any of the burst buffers 114 that are dedicated for use by the burst buffer appliance 104, such as the burst buffers 114-1, 114-2 and 114-3 in the FIG. 1 embodiment, are illustratively configured using flash storage devices or other types of high-speed storage devices similar to those utilized in the high-speed memory pool 100.

By way of example, the burst buffer appliance 104 in the present embodiment may be configured to enhance the IO throughput performance of the information processing system 100 by supporting fast checkpointing of one or more compute nodes 106. More particularly, the compute nodes 106 can write data files comprising checkpoint data to the burst buffers 114 at very high speeds, and that checkpoint data is later written at a much slower rate from the burst buffers to the parallel file system 102. This ensures that other operations of the compute nodes 106 are not unduly delayed by the writing of checkpoint data while also allowing the system 100 to continue to utilize the parallel file system 102.

It is also possible that the burst buffer appliance 104 may include multiple virtual machines that facilitate prioritization of checkpoints as well as coordination of priorities for other types of IO operations that involve utilization of the burst buffers 114 of the burst buffer appliance. For example, different virtual machines of the burst buffer appliance may be used to process different types of data files, such as data files comprising checkpoint data and data files comprising sensor data. Such an arrangement permits different IO throughput performance levels to be provided for the different types of data files. The particular number of virtual machines implemented in the burst buffer appliance 104 may be varied, as well as the types of TO operations that are subject to virtual machine control. Additional details regarding such functionality can be found in U.S. patent application Ser. No. 13/728,421, filed Dec. 27, 2012 and entitled "Burst Buffer Appliance Comprising Multiple Virtual Machines," which is commonly assigned herewith and incorporated by reference herein.

Accordingly, the term "burst buffer appliance" as used herein is intended to be broadly construed, so as to encompass any network appliance or other arrangement of hardware and associated software or firmware that collectively provides multiple burst buffers implemented using high-speed storage devices, supplemented in some embodiments by an analytics engine and possibly one or more virtual machines that control access to the high-speed storage devices for distinct types of IO operations. Thus, such an appliance includes a high-speed memory that may be viewed as serving as a buffer between a computer system comprising compute nodes 106 and a file system such as parallel file system 102, for storing bursts of data associated with different types of IO operations.

Communications between the parallel file system 102 and the burst buffer appliance 104, and between the burst buffer appliance 104 and the compute nodes 106, may take place over one or more networks. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

At least portions of the parallel file system 102, burst buffer appliance 104 and compute nodes 106 may be implemented using one or more processing platforms, examples of which will be described in greater detail below in conjunction with FIGS. 6 and 7. A given such processing platform comprises at least one processing device comprising a processor coupled to a memory, and the processing device may be implemented at least in part utilizing one or more virtual machines.

Although shown in FIG. 1 as being separate from the parallel file system 102 and compute nodes 106, the burst buffer appliance 104 in other embodiments may be implemented at least in part within one or more of these system elements. It is also to be appreciated that a given embodiment of the information processing system 100 may include multiple instances of one or more of the parallel file system 102, the burst buffer appliance 104 and the set of M compute nodes 106, although only a single instance of each of these elements is shown in the system diagram for clarity and simplicity of illustration.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in greater detail with reference to the flow diagram of FIG. 2. The process as shown includes steps 200 through 206, and is suitable for use in the system 100 but is more generally applicable to other systems comprising a high-speed memory pool that is shared between a cluster file system and at least one burst buffer appliance.

In step 200, a high-speed memory pool is configured for allocation between a cluster file system and a burst buffer appliance. With reference to the FIG. 1 embodiment, the high-speed memory pool 110 is configured under the direction of controller 120 for allocation between the parallel file system 102 and the burst buffer appliance 104. Again, the high-speed memory pool is assumed to be implemented using flash storage devices, although as indicated above other types of low-latency memory could be used.

In step 202, portions of the high-speed memory pool are dynamically adapted between utilization as OSSs of the cluster file system and utilization as burst buffers of the burst buffer appliance. As illustrated in FIG. 1, this involves determining a particular current allocation of portions of the high-speed memory pool between the OSSs 112 of the parallel file system 102 and the burst buffers 114 of the burst buffer appliance 104. The current allocation shown in FIG. 1 involves using some portions of the high-speed memory pool 110 to implement the OSSs 112-$k$ through 112-K, and other portions of the high-speed memory pool 110 to implement the burst buffers 114-$n$ through 114-N.

In step 204, one or more of IO performance, checkpointing and power consumption are monitored. Such monitoring in the FIG. 1 embodiment is assumed to be performed under the direction of the controller 120 and may involve the use of sensors of a sensor network of the type mentioned previously herein, or various other types of monitoring arrangements. The particular types of operating conditions and other factors that are monitored can be varied depending upon the needs of a given implementation.

In step 206, a determination is made as to whether or not desired levels have been achieved for the monitored IO performance, checkpointing or power consumption.

If the desired levels have not been achieved, the process returns to step 202 in order to dynamically adapt the allocation of the high-speed memory pool 110. This generally involves the controller 120 determining and implementing an alternative allocation, different than the current allocation, so as to facilitate achievement of the desired levels for at least one of IO performance, checkpointing and power consumption.

Possible alternative allocations determined and implemented by the controller 120 might involve reducing the number of OSSs 112 in parallel file system 102 and using the freed-up portions of the high-speed memory pool 110 to provide additional burst buffers 114 in the burst buffer appliance 104, or vice-versa.

If the desired levels have been achieved, the process returns to step 204 in order to continue the monitoring of one or more of IO performance, checkpointing and power consumption. The determination in step 206 is then repeated periodically and further dynamic adaption of the allocation is made in step 202 as needed, possibly in response to changing operating conditions and other factors.

Figure 2:
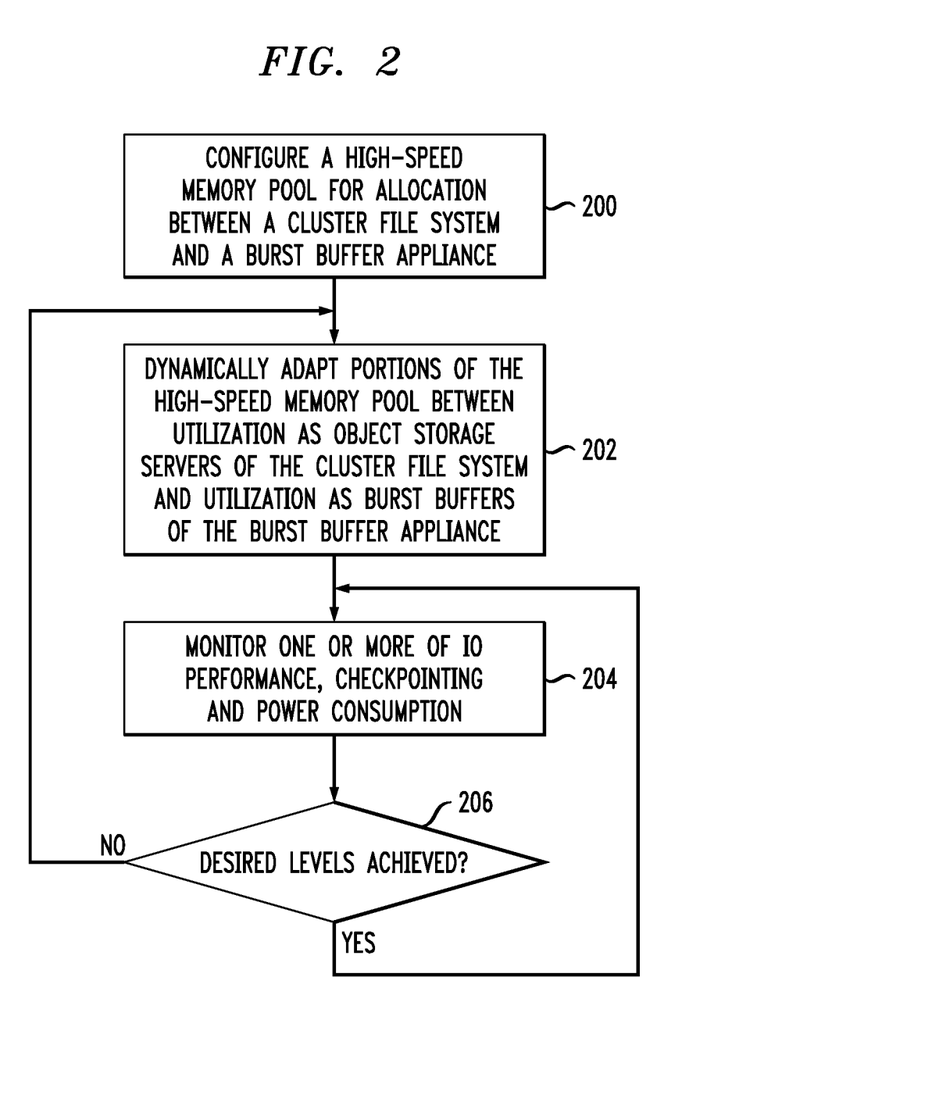
FIG. 2 is a flow diagram of a process for dynamic allocation of a high-speed memory pool suitable for use in the system of FIG. 1.

The particular processing operations and other system functionality described in conjunction with the flow diagram of FIG. 2 are presented by way of illustrative example only, and should not be construed as limiting the scope of the invention in any way. Alternative embodiments can use other types of processing operations to provide dynamic allocation of a high-speed memory pool between a cluster file system and one or more burst buffer appliances. For example, the ordering of the process steps may be varied in other embodiments, or certain steps may be performed concurrently with one another rather than serially. Also, one or more of the process steps may be repeated periodically for different processing applications, or performed in parallel for multiple instances of burst buffer appliances supporting multiple processing applications.

It is to be appreciated that functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Exemplary dynamic allocation functionality implemented in one or more embodiments of the invention will now be described in more detail with reference to FIGS. 3 to 5. In these embodiments, it is assumed that the compute nodes of the HPC system more particularly comprise compute nodes of a supercomputer, and further that the compute nodes run a simulation application, denoted in the figures as "Sim." The Sim application is periodically checkpointed using a checkpointing process denoted "Ckpt." Also, the shared high-speed memory pool in these embodiments is assumed to be implemented using flash servers that can be dynamically reconfigured to operate as either OSSs of a Lustre file system or burst buffers of at least one burst buffer appliance.

Figure 3:
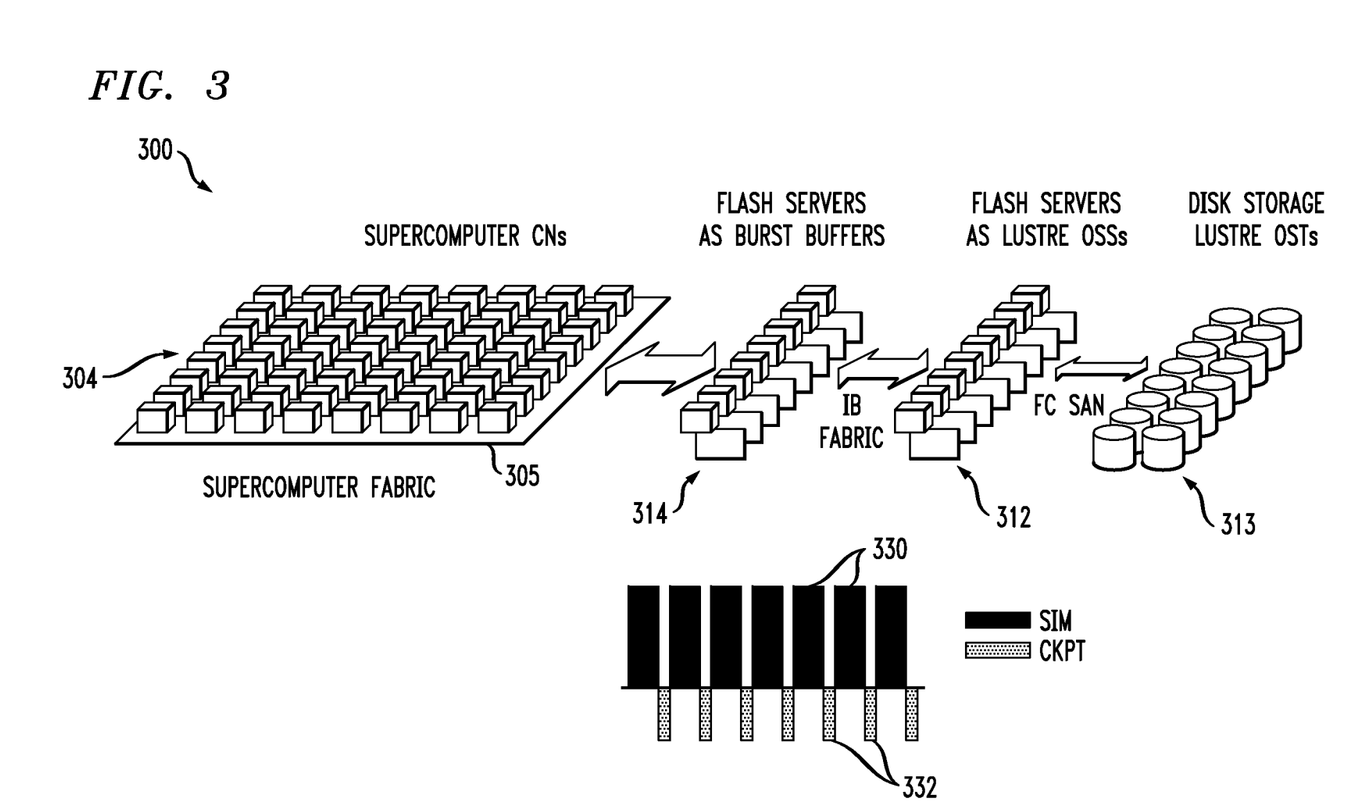
FIGS. 3, 4 and 5 illustrate different allocations of a high-speed memory pool between a cluster file system and a burst buffer appliance in another embodiment of an information processing system.
Figure 4:
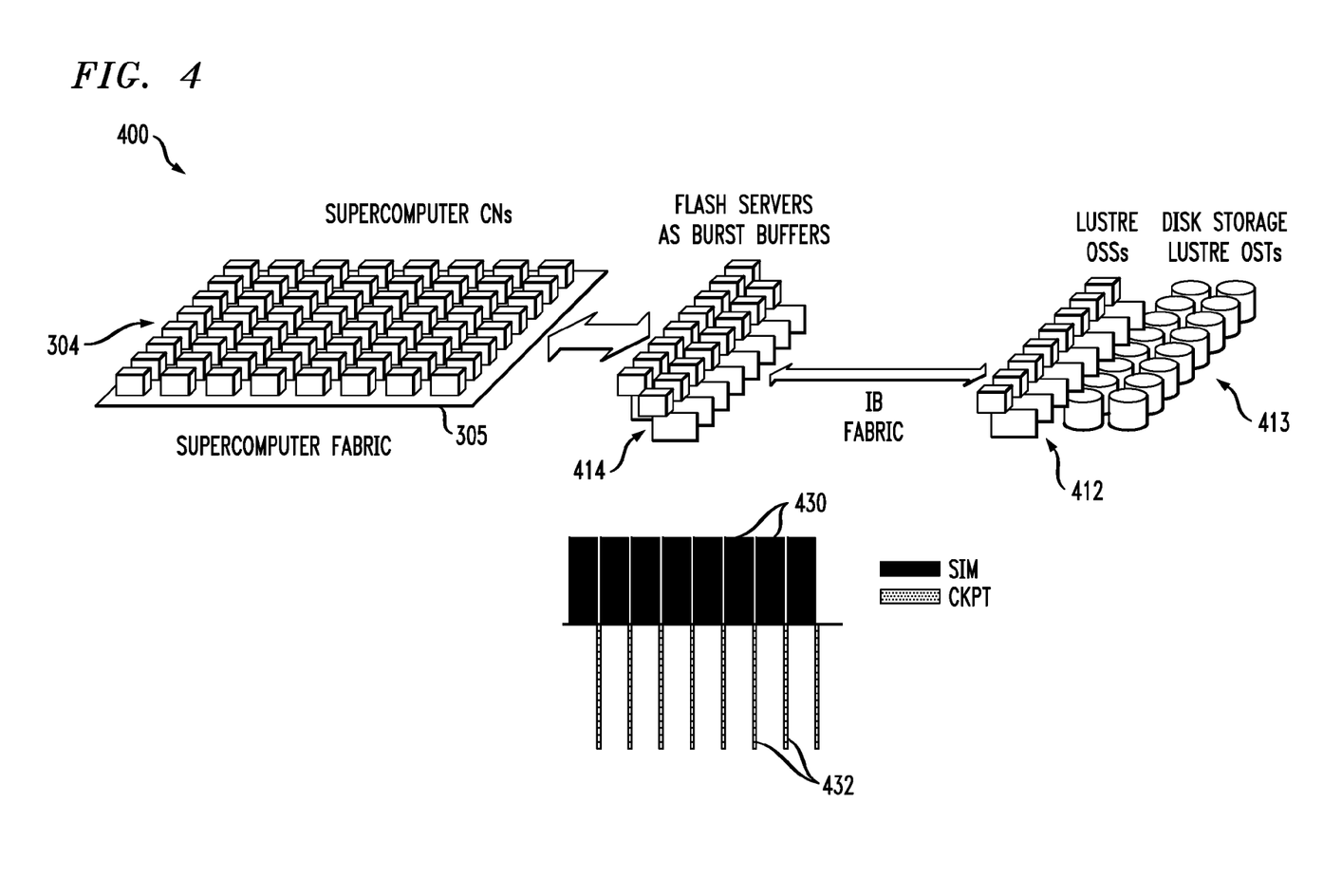
Figure 5:
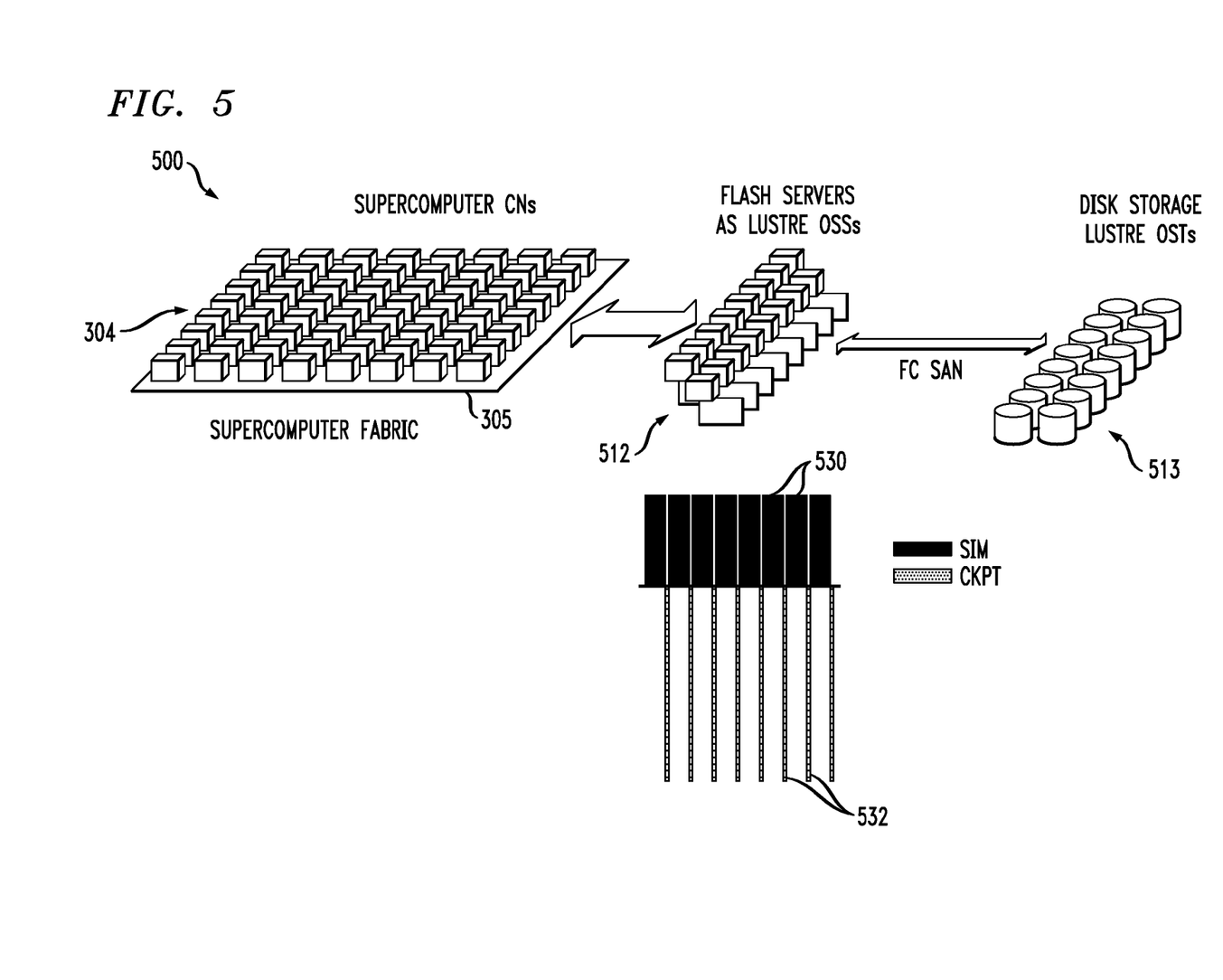

FIGS. 3, 4 and 5 more particularly show respective distinct system configurations corresponding to respective different allocations of the shared high-speed memory pool within a given information processing system comprising the Lustre file system, one or more burst buffer appliances and the supercomputer CNs.

Referring initially to FIG. 3, the information processing system in a first configuration 300 includes an HPC system comprising a plurality of compute nodes or CNs 304 interconnected by a supercomputer fabric 305. The information processing system in configuration 300 further comprises first and second allocated groups of flash servers of the high-speed memory pool. The flash servers of the first allocated group of the high-speed memory pool are configured as respective Lustre OSSs 312. The Lustre OSSs 312 are associated with Lustre OSTs 313 that are configured using disk storage devices, with it being assumed that such disk storage devices generally consume significantly more power than corresponding ones of the flash servers in providing a given amount of storage capacity. The flash servers of the second allocated group of the high-speed memory pool are configured as respective burst buffers 314 of one or more burst buffer appliances.

In the FIG. 3 embodiment, the burst buffers 314 are coupled to the supercomputer CNs 304 via the supercomputer fabric 305, and are coupled to the Lustre OSSs 312 via an InfiniBand (IB) fabric. The Lustre OSSs 312 are coupled to the Lustre OSTs 313 via a Fibre Channel (FC) storage area network (SAN). Other types of interconnections between the burst buffers, OSSs and OSTs may be used in other embodiments.

The dynamic allocation illustrated in FIG. 3 provides a tiered arrangement in which portions of the high-speed memory pool are allocated to both the Lustre file system and the burst buffer appliance. The timing diagram in the lower portion of the figure illustrates periodic intervals 330 for execution of the Sim application. The Sim application execution intervals 330 are interleaved with periodic intervals 332 for the checkpointing process Ckpt. For this configuration, IO operations are executed at high speed using the burst buffers 314 and subsequently "drained" to the OSSs 312 at a lower speed (e.g., one-tenth the burst buffer speed) with data being written to the OSTs 313 at a speed substantially matching that of its disk storage devices. Some parts of this process may occur under application control while other parts are performed in accordance with a specified automatic policy. Such an arrangement can facilitate the achievement of desired levels of IO performance and checkpointing duration while also controlling power consumption by limiting the number of disk storage devices that are used.

FIG. 4 shows another configuration 400 of the information processing system. In this configuration, all of the allocatable flash servers of the high-speed memory pool are configured as respective burst buffers 414 of one or more burst buffer appliances. Accordingly, no flash servers of the high-speed memory pool are used to implement Lustre OSSs. Instead, dedicated resources that are not part of the high-speed memory pool, such as those used to implement OSSs 112-1, 112-2 and 112-3 in the FIG. 1 embodiment, are utilized to implement Lustre OSSs 412 in configuration 400. The Lustre OSSs 412 are associated with Lustre OSTs 413 that are configured using disk storage devices.

In the FIG. 4 embodiment, the burst buffers 414 are coupled to the supercomputer CNs 304 via the supercomputer fabric 305, and are coupled to the Lustre OSSs 412 via the IB fabric as shown. The Lustre OSSs 412 can communicate with the Lustre OSTs 413 via the FC SAN as in the FIG. 3 embodiment, although the FC SAN is not explicitly shown in FIG. 4.

With reference to the timing diagram in the lower portion of FIG. 4, the checkpointing is performed much more quickly in configuration 400 than in the configuration 300. It can be seen that Sim application execution intervals 430 are interleaved with periodic intervals 432 for the checkpointing process Ckpt, but the interval durations for Sim are increased and those for Ckpt are decreased, relative to those associated with configuration 300. More particularly, IO operations can be performed in the configuration 400 at the maximum speed of the supercomputer fabric 305, and thus in a fraction (e.g., one-half) of the time required in the tiered arrangement of configuration 300, and subsequently "drained" to the OSSs 412 at a lower speed (e.g., one-twentieth the burst buffer speed) with data being written to the OSTs 413 at a speed substantially matching that of its disk storage devices. Power consumption is reduced relative to the configuration 300, as fewer disk storage devices will be active and as noted above such devices generally consume more power than flash servers.

FIG. 5 shows another configuration 500 of the information processing system. In this configuration, all of the allocatable flash servers of the high-speed memory pool are configured as respective OSSs 512 of the Lustre file system. Accordingly, no flash servers of the high-speed memory pool are used to implement burst buffers. Instead, the burst buffers are effectively eliminated in this embodiment. It is assumed for this embodiment that there are no dedicated resources that are not part of the high-speed memory pool, such as those used to implement burst buffers 114-1, 114-2 and 114-3 in the FIG. 1 embodiment. The Lustre OSSs 512 are associated with Lustre OSTs 513 that are configured using disk storage devices.

In the FIG. 5 embodiment, the Lustre OSSs 512 are coupled to the supercomputer CNs 304 via the supercomputer fabric 305, and are coupled to the Lustre OSTs 513 via the FC SAN as shown.

With reference to the timing diagram in the lower portion of FIG. 5, the Sim application is performed in execution intervals 530 that are interleaved with periodic intervals 532 for the checkpointing process Ckpt. The IO operations are illustratively performed at the same speed as in the configuration 300, but automatically drained to the Lustre OSSs 512, seamlessly to the application and at a speed comparable to the burst buffer speed. In accordance with an automatic policy, data is written continuously in configuration 500 to the disk storage OSTs 513 at maximum disk speed. Power consumption is reduced in this configuration through reduction in the number of active disk storage devices. The time between checkpoint intervals is reduced relative to that of configurations 300 and 400 assuming a constant checkpoint speed. Alternatively, the checkpoint speed can be increased by using a lower drain rate, such as that used in the configuration 300.

The configurations 300, 400 and 500 are examples of different allocations of flash servers of a high-speed memory pool that may be made under the direction of a controller such as controller 120 in FIG. 1. Such arrangements allow adaptive changes in the number of OSSs and burst buffers to be made responsive to application requests, variations in policies for checkpointing duration, as well as other variations in operating conditions or other factors in a given information processing system. Also, power consumption can be reduced by replacing disk storage device operations with flash server operations.

By way of example, with reference to the embodiments of FIGS. 3-5, the simulation application running on the supercomputer CNs 304 can request a certain processing speed from a job scheduler implemented in or otherwise associated with the memory pool controller. If the desired speed is not achieved using a particular allocation of the memory pool resources between OSSs and burst buffers, the allocation of the memory pool resources can be dynamically altered, possibly to all OSSs as in the configuration 500 of FIG. 5 or all burst buffers as in the configuration 400 of FIG. 4.

Numerous other types of allocations may be used in other embodiments as determined by a controller responsive to changes in operating conditions and other factors. For example, dynamic allocation of a high-speed memory pool between OSSs of a cluster file system and burst buffers of one or more burst buffer appliances can be used to respond to a higher temporary failure rate, which may result from higher disk storage device temperatures attributable to increased power consumption. In such an arrangement, the portion of the high-speed memory pool assigned for utilization as burst buffers may be decreased and the portion assigned for utilization as OSSs may be increased, such that the number of disk seek operations can be reduced, thereby reducing power consumption. Other types of allocations can be used to minimize the number of active disks and thereby control power consumption.

In these and other arrangements, the flash devices or other resources of the high-speed memory pool are repurposed in accordance with application needs, environmental conditions, and other operating conditions or factors.

The dynamic allocation of flash servers or other resources of a high-speed memory pool between utilization as OSSs or burst buffers makes it possible to dynamically balance the conflicting requirements of storage capacity and IO throughput, thereby avoiding situations in which either performance is less than optimal or the costs of implementing the system become excessive. Moreover, desired levels of checkpointing performance and power consumption can be achieved in an efficient manner. Arrangements of this type can provide further acceleration of IO operations in the system 100, leading to enhanced system performance relative to conventional arrangements, while additionally or alternatively providing an ability to achieve particular levels of performance at lower cost.

It is to be appreciated that the particular dynamic allocation arrangements illustrated in FIGS. 3, 4 and 5 are exemplary only, and numerous other types of dynamic allocation of a high-speed memory pool between a cluster file system and at least one burst buffer appliance may be used in other embodiments.

For example, the disclosed techniques may be adapted in a straightforward manner for dynamically allocating portions of a high-speed memory pool between more than two distinct storage tiers.

It was noted above that portions of the information processing system 100 may be implemented using one or more processing platforms. Illustrative embodiments of such platforms will now be described in greater detail. Although described in the context of system 100, these platforms may also be used to implement at least portions of the information processing system of configurations 300, 400 and 500 of FIGS. 3 through 5, as well as other embodiments of the invention.

Figure 6:
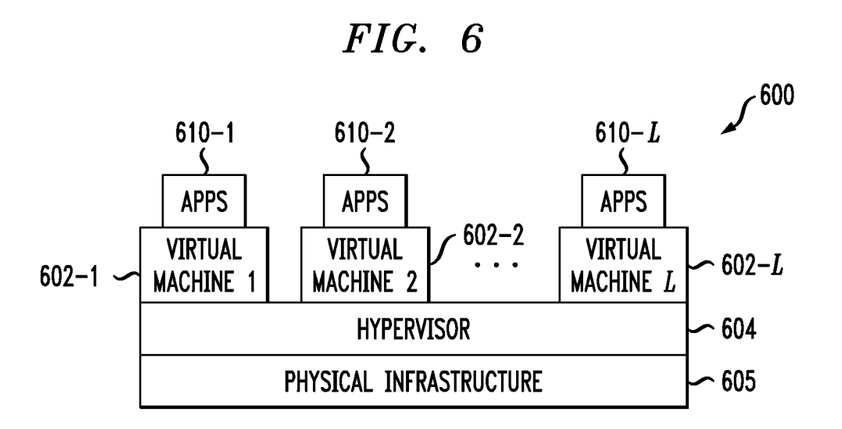
FIGS. 6 and 7 show examples of processing platforms that may be utilized to implement at least a portion of each of the information processing systems of FIGS. 1 and 3-5.
Figure 7:
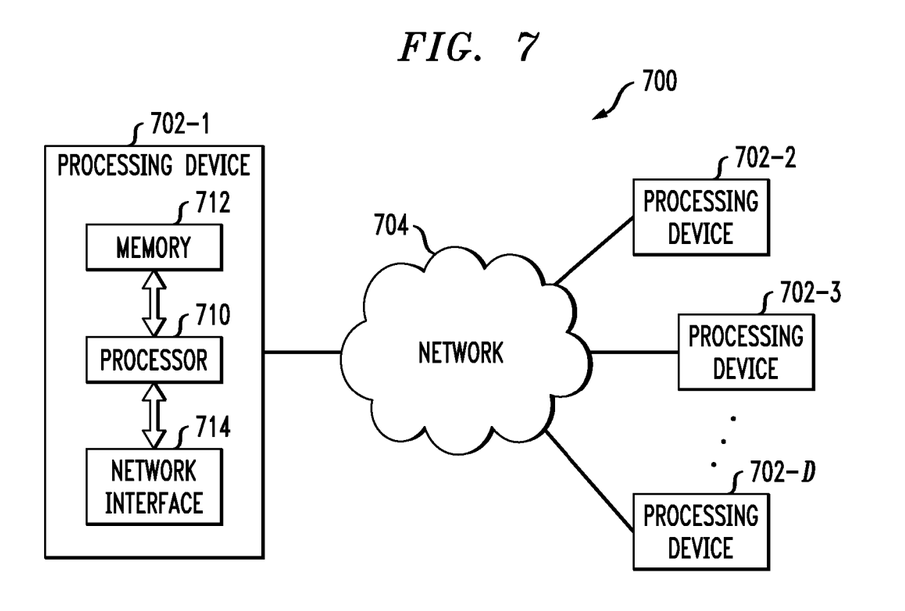

As shown in FIG. 6, portions of the information processing system 100 may comprise cloud infrastructure 600. The cloud infrastructure 600 comprises virtual machines (VMs) 602-1, 602-2, . . . 602-L implemented using a hypervisor 604. The hypervisor 604 runs on physical infrastructure 605. The cloud infrastructure 600 further comprises sets of applications 610-1, 610-2, . . . 610-L running on respective ones of the virtual machines 602-1, 602-2, . . . 602-L under the control of the hypervisor 604.

Although only a single hypervisor 604 is shown in the embodiment of FIG. 6, the system 100 may of course include multiple hypervisors each providing a set of virtual machines using at least one underlying physical machine. Different sets of virtual machines provided by one or more hypervisors may be utilized in configuring multiple instances of the burst buffer appliance 104.

An example of a commercially available hypervisor platform that may be used to implement hypervisor 604 and possibly other portions of the information processing system 100 in one or more embodiments of the invention is the VMware® vSphere® which may have an associated virtual infrastructure management system such as the VMware® vCenter™. The underlying physical machines may comprise one or more distributed processing platforms that include storage products, such as the above-noted VNX and Symmetrix VMAX. A variety of other storage products may be utilized to implement at least a portion of the system 100.

One or more of the processing modules or other components of system 100 may therefore each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-D, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA) or other type of processing circuitry, as well as portions or combinations of such circuitry elements.

The memory 722 may comprise random access memory (RAM), read-only memory (ROM) or other types of memory, in any combination. The memory 722 and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage device such as a storage disk, a storage array or an integrated circuit containing memory. The term "article of manufacture" as used herein should be understood to exclude transitory, propagating signals.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of a cluster file system or burst buffer appliance as disclosed herein can be implemented at least in part in the form of one or more software programs stored in memory and executed by a processor of a processing device such as one of the virtual machines 602 or one of the processing devices 702.

It should again be emphasized that the above-described embodiments of the invention are presented for purposes of illustration only. Many variations and other alternative embodiments may be used. For example, the disclosed techniques are applicable to a wide variety of other types of information processing systems, file systems, burst buffer appliances and computer systems that can benefit from the performance advantages associated with dynamic allocation of memory pool resources between a cluster file system and one or more burst buffers. Also, the particular configurations of system and device elements shown in FIGS. 1 and 3-7 can be varied in other embodiments. Thus, for example, the particular type of cluster file system and the number of burst buffer appliances deployed in a given embodiment and their respective configurations may be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising: a cluster file system; a burst buffer appliance coupled to the cluster file system;
    a high-speed memory pool configured for allocation between the cluster file system and the burst buffer appliance; and
    a controller associated with the high-speed memory pool and configured to dynamically adapt portions thereof between utilization as object storage servers of the cluster file system and utilization as burst buffers of the burst buffer appliance;
    wherein a given one of the portions of the high-speed memory pool is configured for utilization as at least a portion of one or more of the object storage servers of the cluster file system under a first set of operating conditions and the same given portion is configured for utilization as at least a portion of one or more of the burst buffers of the burst buffer appliance under a second set of operating conditions different than the first set of operating conditions;
    wherein the controller changes allocation of the same given portion of the high-speed memory pool from the cluster file system to the burst buffer appliance responsive to a change from the first set of operating conditions to the second set of operating conditions;
    wherein the burst buffer appliance is adapted for coupling between at least a portion of the cluster file system and one or more compute nodes of a computer system;
    wherein at least two of input-output performance, checkpoint duration and power consumption of the one or more compute nodes of the computer system are monitored; and
    wherein the controller is configured to detect the change from the first set of operating conditions to the second set of operating conditions based, at least in part, on a result of the monitoring.

2. The apparatus of claim 1 wherein the burst buffer appliance is one of a plurality of burst buffer appliances coupled to the cluster file system and the high-speed memory pool is adapted for allocation between the cluster file system and the plurality of burst buffer appliances.

3. The apparatus of claim 1 wherein the high-speed memory pool comprises a plurality of flash servers that are dynamically reconfigurable between utilization as respective ones of the object storage servers of the cluster file system and utilization as respective ones of the burst buffers of the burst buffer appliance, and further wherein the controller is configured to dynamically adapt the flash servers between utilization as respective object storage servers of the cluster file system and utilization as respective burst buffers of the burst buffer appliance.

4. The apparatus of claim 3 wherein substantially all of the flash servers of the high-speed memory pool are allocated for utilization as respective object storage servers of a high-speed storage tier of the cluster file system under the first set of operating conditions and substantially all of the flash servers of the high-speed memory pool are allocated for utilization as respective burst buffers of the burst buffer appliance under the second set of operating conditions different than the first set of operating conditions.

5. The apparatus of claim 1 wherein the controller adjusts allocation of the high-speed memory pool between the high-speed storage tier of the cluster file system and the burst buffer appliance in order to achieve a desired level of the input-output performance.

6. The apparatus of claim 1 wherein the controller adjusts allocation of the high-speed memory pool between the high-speed storage tier of the cluster file system and the burst buffer appliance based at least in part on information received from an application running on a compute node of the one or more compute nodes.

7. The apparatus of claim 6 wherein said information comprises a request received from the application wherein the request specifies a desired level of the input-output performance for the application.

8. The apparatus of claim 1 wherein the controller adjusts allocation of the high-speed memory pool between the cluster file system and the burst buffer appliance in order to permit implementation of a desired checkpointing policy including a specified checkpoint duration.

9. The apparatus of claim 1 wherein the controller adjusts allocation of the high-speed memory pool between the cluster file system and the burst buffer appliance in order to achieve a desired level of the power consumption for at least a portion of the cluster file system.

10. The apparatus of claim 1 wherein the cluster file system comprises a Lustre file system.

11. A processing platform comprising the apparatus of claim 1.

12. A method comprising:
configuring a high-speed memory pool for allocation between a cluster file system and a burst buffer appliance; and
dynamically adapting portions of the high-speed memory pool between utilization as object storage servers of the cluster file system and utilization as burst buffers of the burst buffer appliance;
wherein dynamically adapting portions of the high-speed memory pool between utilization as object storage servers of the cluster file system and utilization as burst buffers of the burst buffer appliance comprises:
configuring a given one of the portions of the high-speed memory pool for utilization as at least a portion of one or more of the object storage servers of the cluster file system under a first set of operating conditions; and
configuring the same given portion for utilization as at least a portion of one or more of the burst buffers of the burst buffer appliance under a second set of operating conditions different than the first set of operating conditions;
wherein the configuring of the same given portion for utilization as at least the portion of one or more of the burst buffers comprises changing allocation of the same given portion of the high-speed memory pool from the cluster file system to the burst buffer appliance responsive to a change from the first set of operating conditions to the second set of operating conditions;
wherein the burst buffer appliance is adapted for coupling between at least a portion of the cluster file system and one or more compute nodes of a computer system;
wherein the method further comprises:
monitoring at least two of input-output performance, checkpoint duration and power consumption of the one or more compute nodes of the computer system; and
detecting the change from the first set of operating conditions to the second set of operating conditions based, at least in part, on a result of the monitoring; and
wherein the configuring, dynamically adapting, monitoring and detecting are performed by at least one processing device comprising a processor coupled to a memory.

13. The method of claim 12 wherein said configuring of the high-speed memory pool comprises providing a plurality of flash servers for allocation between the cluster file system and the burst buffer appliance, and further wherein said dynamically adapting portions of the high-speed memory pool comprises dynamically adapting the flash servers between utilization as respective object storage servers of the cluster file system and utilization as respective burst buffers of the burst buffer appliance.

14. The method of claim 12 wherein said dynamically adapting portions of the high-speed memory pool comprises one or more of:
adjusting allocation of the high-speed memory pool between the cluster file system and the burst buffer appliance in order to achieve a desired level of the input-output performance;
adjusting allocation of the high-speed memory pool between the cluster file system and the burst buffer appliance based at least in part on information received from an application;
adjusting allocation of the high-speed memory pool between the cluster file system and the burst buffer appliance in order to permit implementation of a desired checkpointing policy including a specified checkpoint duration; and
adjusting allocation of the high-speed memory pool between the cluster file system and the burst buffer appliance in order to achieve a desired level of the power consumption for at least a portion of the cluster file system.

15. An article of manufacture comprising a non-transitory processor-readable storage medium having stored therein program code of one or more software programs, wherein the program code when executed by said at least one processing device causes the method of claim 12 to be performed.

16. Information processing system comprising: a computer system comprising a plurality of compute nodes; a cluster file system;
a burst buffer appliance coupled between one or more of the compute nodes of the computer system and at least a portion of the cluster file system;
a high-speed memory pool configured for allocation between the cluster file system and the burst buffer appliance; and
a controller associated with the high-speed memory pool and configured to dynamically adapt portions thereof between utilization as object storage servers of the cluster file system and utilization as burst buffers of the burst buffer appliance;
wherein a given one of the portions of the high-speed memory pool is configured for utilization as at least a portion of one or more of the object storage servers of the cluster file system under a first set of operating conditions and the same given portion is configured for utilization as at least a portion of one or more of the burst buffers of the burst buffer appliance under a second set of operating conditions different than the first set of operating condition;
wherein the controller changes allocation of the same given portion of the high-speed memory pool from the cluster file system to the burst buffer appliance responsive to a change from the first set of operating conditions to the second set of operating conditions;
wherein at least two of input-output performance, checkpoint duration and power consumption of the one or more compute nodes of the computer system are monitored; and
wherein the controller is configured to detect the change from the first set of operating conditions to the second set of operating conditions based, at least in part, on a result of the monitoring.

17. The system of claim 16 wherein the computer system comprises a supercomputer and the cluster file system comprises a Lustre file system.

18. The system of claim 16 wherein the high-speed memory pool comprises a plurality of flash servers that are dynamically reconfigurable between utilization as respective ones of the object storage servers of the cluster file system and utilization as respective ones of the burst buffers of the burst buffer appliance, and further wherein the controller is configured to dynamically adapt the flash servers between utilization as respective object storage servers of the cluster file system and utilization as respective burst buffers of the burst buffer appliance.

19. The system of claim 18 wherein substantially all of the flash servers of the high-speed memory pool are allocated for utilization as respective object storage servers of a high-speed storage tier of the cluster file system under the first set of operating conditions and substantially all of the flash servers of the high-speed memory pool are allocated for utilization as respective burst buffers of the burst buffer appliance under the second set of operating conditions different than the first set of operating conditions.

20. The system of claim 16 wherein the controller adjusts allocation of the high-speed memory pool between the cluster file system and the burst buffer appliance in order to permit implementation of a desired checkpointing policy including a specified checkpoint duration.

\* \* \* \* \*